(12) United States Patent
Zogg, Jr. et al.

(10) Patent No.: US 11,059,913 B2
(45) Date of Patent: Jul. 13, 2021

(54) POLYMERIZATION AND ISOLATION OF LOW VISCOSITY POLYMERS USING PASTILLATION TECHNOLOGY

(71) Applicant: Dow Global Technologies LLC, Midland, MI (US)

(72) Inventors: Michael J. Zogg, Jr., Houston, TX (US); Santosh S. Bawiskar, Sugar Land, TX (US); Yi Jin, Missouri City, TX (US); Daniel S. Rynearson, Lake Jackson, TX (US); Harold W. Boone, Houston, TX (US); Kate R. Brown, Houston, TX (US); Barry D. Kluge, Jr., Richwood, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/631,119

(22) PCT Filed: Jul. 2, 2018

(86) PCT No.: PCT/US2018/040544
§ 371 (c)(1),
(2) Date: Jan. 14, 2020

(87) PCT Pub. No.: WO2019/014005
PCT Pub. Date: Jan. 17, 2019

(65) Prior Publication Data
US 2020/0131282 A1 Apr. 30, 2020

Related U.S. Application Data

(60) Provisional application No. 62/532,487, filed on Jul. 14, 2017.

(51) Int. Cl.
*C08F 2/04* (2006.01)
*C08F 2/01* (2006.01)
(Continued)

(52) U.S. Cl.
CPC ............ *C08F 2/04* (2013.01); *C08F 2/01* (2013.01); *C08F 10/02* (2013.01); *C08F 10/06* (2013.01); *B29B 9/10* (2013.01); *C08F 2400/02* (2013.01)

(58) Field of Classification Search
CPC .. C08F 2/04; C08F 10/06; C08F 10/02; C08F 2/01; C08F 2400/02; B29B 9/10
(Continued)

(56) References Cited

U.S. PATENT DOCUMENTS

| 2,790,201 A | 4/1957 | Eilbracht et al. |
| 4,610,615 A | 9/1986 | Froeschke |

(Continued)

FOREIGN PATENT DOCUMENTS

EP 2392611 A2 12/2011

OTHER PUBLICATIONS

PCT/US2018/040544 International Search Report and Written Opinion of the International Searching Authority, dated Oct. 5, 2018.
(Continued)

*Primary Examiner* — William K Cheung
(74) *Attorney, Agent, or Firm* — Cheney H. Huang (57) ABSTRACT

A process to form an olefin-based polymer, said process comprising at least the following steps: a) polymerizing a reaction mixture comprising an olefin, in at least one reactor, in a solution polymerization, to form a polymer solution; b) feeding at least a portion of the polymer solution through at least one devolatilizer, to form the olefin-based polymer, in melt form; c) feeding at least a portion of the olefin-based polymer, in melt, form through a heat exchanger, and then into a pastillation apparatus to form polymer particles.

10 Claims, 1 Drawing Sheet

(51) Int. Cl.
    *C08F 10/02*     (2006.01)
    *C08F 10/06*     (2006.01)
    *B29B 9/10*     (2006.01)

(58) Field of Classification Search
    USPC .......................................................... 526/201
    See application file for complete search history.

(56) References Cited

U.S. PATENT DOCUMENTS

| | | |
|---|---|---|
| 5,198,233 A | 3/1993 | Kaiser |
| 5,340,509 A | 8/1994 | Chang et al. |
| 5,510,454 A | 4/1996 | Stouffer et al. |
| 5,633,018 A * | 5/1997 | Stouffer ............... B01J 2/26 425/8 |
| 5,670,606 A | 9/1997 | Stouffer et al. |
| 5,744,074 A | 4/1998 | Stouffer et al. |
| 5,830,982 A | 11/1998 | Stouffer et al. |
| 7,267,878 B2 | 9/2007 | Primke et al. |
| 8,203,008 B2 | 6/2012 | De Vos |
| 2007/0083022 A1 * | 4/2007 | Hoecker ............... C08G 61/02 526/282 |
| 2009/0121372 A1 | 5/2009 | Campbell et al. |
| 2010/0273936 A1 | 10/2010 | Yeh et al. |
| 2011/0172375 A1 | 7/2011 | Yeh et al. |
| 2012/0270765 A1 | 10/2012 | Aouad |
| 2017/0129976 A1 | 5/2017 | Kolthammer et al. |

OTHER PUBLICATIONS

PCT/US2018/040544, International Preliminary Report on Patentability dated Jan. 14, 2020.

\* cited by examiner

US 11,059,913 B2

POLYMERIZATION AND ISOLATION OF LOW VISCOSITY POLYMERS USING PASTILLATION TECHNOLOGY

REFERENCE TO RELATED APPLICATION

The present application is a 371 of PCT/US2018/040544 filed Jul. 2, 2018, which claims the benefit of U.S. Provisional Application 62/532,487 filed Jul. 14, 2017.

BACKGROUND

Olefin-based polymers, prepared using a solution polymerization, are typically formed into pellets via an underwater pelletizer. In general, the solution polymerization process occurs in one or more well-stirred reactors, such as one or more loop reactors, or one or more isothermal reactors, and at a temperature in the range from 100 to 300° C.; and at pressures in the range of from 300 to 1,000 psig. Polymerization and isolation processes are disclosed in the following references: U.S. 2009/0121372, U.S. Pat. Nos. 5,340,509, 5,830,982, 5,744,074, 8,203,008, EP 1397455 A1, DE 10122437 A1 (Abstract), U.S. Pat. Nos. 5,510,454, 5,633,018, WO 1997025364, WO 2015191066, U.S. Pat. Nos. 2,790,201, 4,610,615 and EP 0363975 A1. Although an underwater pelletizer is useful for the pelletization of high viscosity polymers, such a technique is not as useful (robust) for lower viscosity polymers (for example, viscosity ≤20,000 cP at 177° C.) since such polymers typically do not have the required melt strength to maintain a shape for cutting. Thus for low viscosity polymers, (for example, ≤5,000 cP at 177° C.) underwater pelletization is not possible, due to insufficient melt strength. In cases where the melt temperature is lowered, close to the melting temperature, to increase the viscosity and melt strength, the possibility to freeze polymer in the die hole occurs, which again causes issues with pelletization.

In underwater pelletization, the pellet is cut at the die face, as it is being cooled by water, and the cutting and cooling processes occur simultaneously. Pastillation is a particle forming process, where a pastille is formed at the droplet former, on a steel belt, and then cooled subsequently on the belt. Thus, the particle formation and cooling process are decoupled (unlike underwater pelletization). The isolation of a polymer product via pastillation is prone to the formation of strings or fibers in the polymer pastilles, due to the adherence of portions of the polymer to the isolation apparatus, for example, the droplet former. The adhered polymer is stretched, until the tensile force exceeds the melt strength of the polymer, at which point, the polymer breaks free from the apparatus, and leaves a string attached to the top of the polymer pastille. Fiber formation during the pastillation is not desirable from a quality and pastille handling standpoint, as these fibers can break and build-up in conveying equipment and also on the pastillator belt. This defect in the polymer pastille is therefore undesirable.

There is thus a need for a method to form polymer particles that avoids the problems associated with pelletization, especially when continuously polymerizing low viscosity olefin based polymers. There is also a need for a one-step continuous process to polymerize and subsequently pastillate (finish) low viscosity olefin-based polymers, with no, or very low, string (fiber) formation. These needs have been met herein.

SUMMARY OF THE INVENTION

A process to form an olefin-based polymer, said process comprising at least the following steps:

a) polymerizing a reaction mixture comprising an olefin, in at least one reactor, in a solution polymerization, to form a polymer solution;

b) feeding at least a portion of the polymer solution through at least one devolatilizer, to form the olefin-based polymer, in melt form;

c) feeding at least a portion of the olefin-based polymer, in melt, form through a heat exchanger, and then into a pastillation apparatus to form polymer particles.

DETAILED DESCRIPTION OF THE INVENTION

Figure 1:
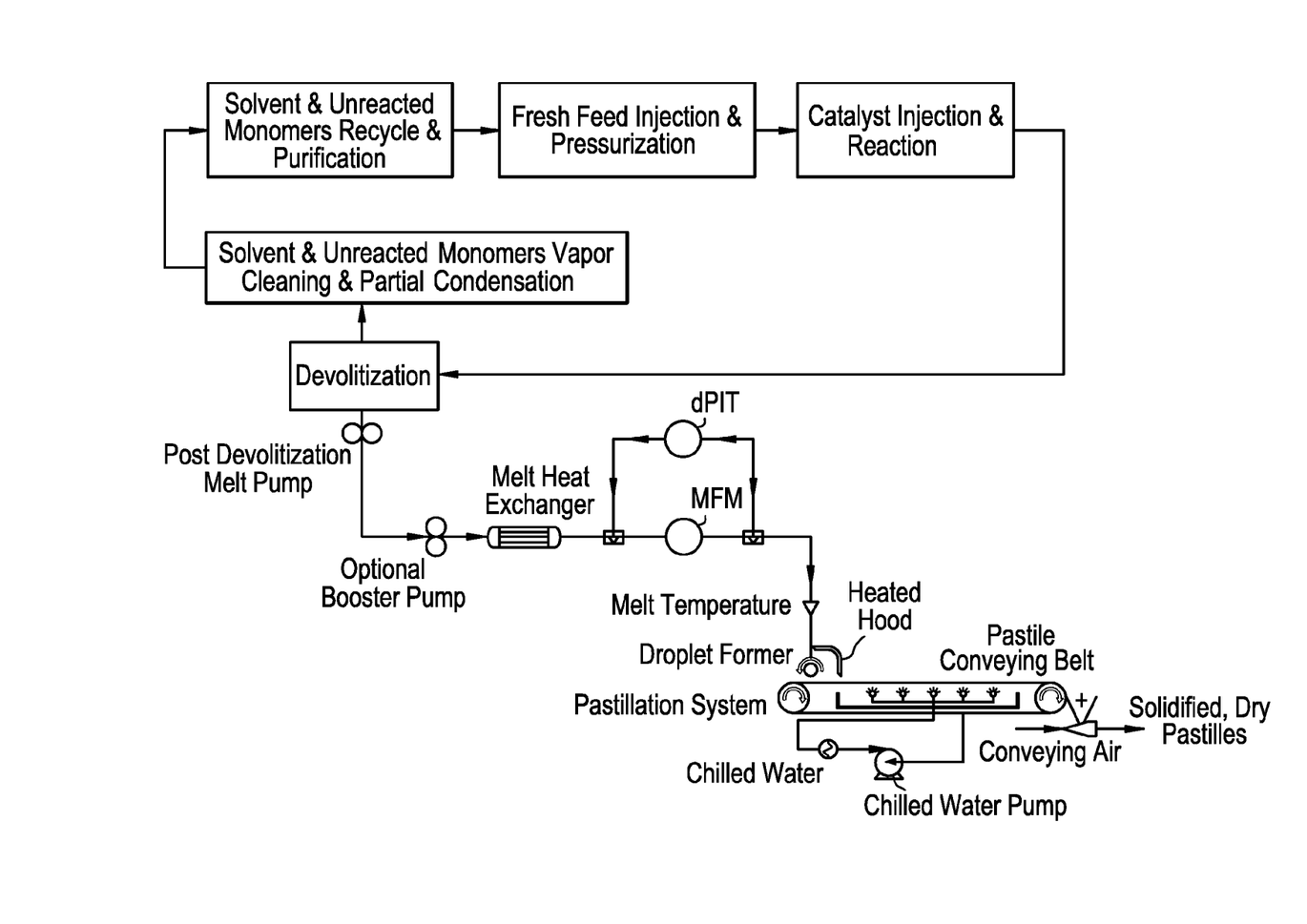
The FIGURE is a schematic of a solution polymerization and isolation process.

A process to form an olefin-based polymer, said process comprising at least the following steps:

a) polymerizing a reaction mixture comprising an olefin, in at least one reactor, in a solution polymerization, to form a polymer solution;

b) feeding at least a portion of the polymer solution through at least one devolatilizer, to form the olefin-based polymer, in melt form;

c) feeding at least a portion of the olefin-based polymer, in melt, form through a heat exchanger, and then into a pastillation apparatus to form polymer particles.

An inventive process may comprise a combination of two or more embodiments as described herein.

In one embodiment, the process is a continuous process (for example, a polymerization process, in which the monomer(s) is/are continuously fed into a reactor, and the polymer product is continuously removed from the reactor).

In one embodiment, for step c, the pastillation apparatus comprises a droplet former, and wherein the olefin-based polymer, in melt form, comes into contact with, and is discharged through, the droplet former. In a further embodiment, the discharged polymer is cooled on a belt.

In one embodiment, the viscosity ($\eta$ in cP) of the olefin-based polymer at the temperature of the olefin-based polymer at the droplet former (T, ° C.) meets the following relationship:

$$\ln(\eta) \leq [0.028T - b(T-T_0) + 2.96],$$

where the coefficient b indicates the temperature sensitivity of the viscosity of the olefin-based polymer; $T_0$ is a reference temperature (177° C.), and $T > T_m + 20°$ C. where $T_m$ is the melting point of the olefin based polymer; and T is the temperature of the olefin-based polymer at the droplet former; and where $\eta = \eta_0 e^{-b(T-T_0)}$, where $\eta_0$ is the viscosity of the olefin-based polymer at 177° C.

In one embodiment, for step b), at least a portion of the polymer solution flows through at least two devolatilizers, to separate the olefin-based polymer, in melt form, from the volatile solvent and unreacted monomers. In one embodiment, for step b), at least a portion of the polymer solution flows through two devolatilizers, to separate the olefin-based polymer, in melt form, from the volatile solvent and unreacted monomers.

In one embodiment, the olefin-based polymer melt has a viscosity, at 177° C. ≤20,000 cP, or ≤10,000 cP, or ≤5,000 cP.

In one embodiment, the olefin-based polymer has a melt viscosity (177° C.) from 500 to 10000 cP, or from 600 to 9000 cP, or from 700 to 8000 cP, or from 800 to 7000 cP, or from 900 to 6000 cP, or from 1000 to 5000 cP, for from 1200 to 4500 cP, or from 1400 to 4000 cP, or from 1600 to 3500 cP.

In one embodiment, the olefin-based polymer has density from 0.855 to 0.960 g/cc, or from 0.860 to 0.950 g/cc, or from 0.865 to 0.940 g/cc, or from 0.870 to 0.930 g/cc, or from 0.875 to 0.920 g/cc, or from 0.870 to 0.910 g/cc, for from 0.870 to 0.900 g/cc, or from 0.870 to 0.890 g/cc, or from 0.870 to 0.885 g/cc.

In one embodiment, the olefin-based polymer has a number average molecular weight (Mn) from 5000 to 30000 g/mole, or from 10000 to 25000 g/mole, or from 10000 to 22000 g/mol.

In one embodiment, the olefin-based polymer has a molecular weight distribution (MWD) from 1.80 to 3.50, or from 1.90 to 3.40, or from 2.00 to 3.30, or from 2.10 to 3.20, or from 2.20 to 3.10.

In one embodiment, the olefin-based polymer has a molecular weight distribution (MWD) from 1.80 to 3.20, or from 1.90 to 3.15, or from 2.00 to 3.10, or from 2.10 to 3.05, or from 2.20 to 3.00.

In one embodiment, the olefin-based polymer has a weight average molecular weight (Mw) from 25000 to 50000 g/mole, or from 27000 to 50000 g/mole, or from 30000 to 50000 g/mol.

In one embodiment, the olefin based polymer has a number average molecular weight from 4000 g/mole to 25,000 g/mole, and a MWD<3.50, or <3.40, or <3.30, or <3.20.

In one embodiment, the olefin based polymer has a number average molecular weight from 4000 g/mole to 25,000 g/mole, and a MWD≤3.50, or ≤3.40, or ≤3.30, or ≤3.20.

In one embodiment, the temperature of the olefin-based polymer melt entering the droplet former is from 130° C. to 280° C., or from 135° C. to 270° C., or from 140° C. to 260° C., or from 140° C. to 250° C. A temperature probe (for example, a thermocouple or an RTD) is inserted directly into the polymer stream or into a thermowell that is in contact with the polymer stream immediately upstream of the pastillator's droplet former.

In one embodiment, a heat exchanger is located upstream from the pastillation apparatus.

In one embodiment, the olefin-based polymer is a propylene-based polymer, and further a propylene-based interpolymer, and further a propylene-based copolymer.

In one embodiment, the olefin-based polymer is a propylene/alpha-olefin interpolymer, and further a propylene/alpha-olefin copolymer. Suitable alpha-olefins include the C4-C8 alpha-olefins, In one embodiment, the olefin-based polymer is a propylene/ethylene interpolymer, and further a propylene/ethylene copolymer.

In one embodiment, the olefin-based polymer is an ethylene-based polymer, and further an ethylene-based interpolymer, and further an ethylene-based copolymer.

In one embodiment, the olefin-based polymer is an ethylene/alpha-olefin interpolymer, and further an ethylene/alpha-olefin copolymer. Suitable alpha-olefins include the C3-C8 alpha-olefins, In one embodiment, the solution polymerization takes place in one or more conventional reactors e.g. loop reactors, isothermal reactors, and/or stirred tank reactors in parallel, series, and/or any combinations thereof in continuous mode to produce olefin based polymers, e.g. ethylene polymers or propylene polymers.

In one embodiment, the polymerization temperature is in the range from 100 to 300° C.; for example, from 120 to 190° C., and at pressures in the range of from 300 to 1,000 psig; for example, from 400 to 750 psig.

The residence time for the solution phase polymerization process is typically in the range of 2 to 30 minutes; for example, from 5 to 15 minutes.

In one embodiment, the polymer pastilles have ≤2,000 ppm$_w$, or ≤1000 ppm$_w$, or ≤750 ppm$_w$, or ≤500 ppm$_w$, of residual volatile components, based on weight of polymer pastilles, and a sample is acquired within 30 minutes of pastillation, and sealed in a vial for off-line laboratory analysis.

Multiple pastillation units may be fed, in parallel, from a single polymer production plant to match the pastillation rate to the polymer production rate. Multiple pastillators are necessary when the heat removal required for proper solidification of the pastilles for a given throughput exceeds the cooling capacity of a single pastillator.

In one embodiment, olefin based polymers, e.g. propylene polymers or ethylene polymers may be prepared using a catalyst composition via a solution phase polymerization process in a single, loop reactor configuration. All raw materials (propylene, and optionally one or more alpha-olefin comonomers such as ethylene or 1-octene) and the process solvent (an isoparaffinic solvent, for example ISOPAR® E) are preferably purified with molecular sieves before introduction into the reaction environment. Hydrogen is supplied as a high purity grade and is not further purified. Fresh monomer feed (propylene) to the reactor is pressurized via a mechanical positive displacement pump to a pressure that is above the reaction pressure (e.g., 650 psig). The recycle feed (containing solvent and unreacted monomer, comonomer, and hydrogen) is pressurized via a mechanical positive displacement pump to a pressure that is above the reaction pressure. The fresh comonomer (ethylene) feed is pressurized, via mechanical compressor, to a pressure that is above the reactor pressure. The individual catalyst components can be manually batch diluted to specified component concentrations with purified solvent and pressurized via mechanical positive displacement pumps to a pressure that is above the reaction pressure. All reaction feed flows are measured with Coriolis mass flow meters (MFM) and independently controlled with computer automated valve control systems.

Independent control of monomer, comonomer, hydrogen, recycle solvent, and catalyst component feeds is possible. The combined solvent, monomer, comonomer and hydrogen feed is temperature controlled to anywhere between 5° C. to 50° C. and typically 15° C. by passing the feed stream through a heat exchanger. After temperature conditioning the stream, the total feed is injected into the polymerization reactor. The catalyst components can be injected into the polymerization reactor through, multiple injectors that separately introduce the catalyst complex and cocatalysts into the reactor for insitu contacting and activation. The catalyst complex feed is computer controlled to maintain the reactor monomer (propylene) concentration at a specified target. The cocatalyst components are fed based on calculated specified molar ratios to the catalyst complex.

The contents of the reactor can be continuously circulated through heat exchangers that have a cold utility fluid flowing across the shell side to remove much of the heat of reaction and maintain a near isothermal reaction environment at a specified temperature; for example 155° C. Water is injected into the polymerization stream as it exits the reactor to terminate the reaction. The polymer solution then passes through a heat exchanger to heat the stream to a temperature in the range of 235-300° C. to prepare for devolatilization. From this heat exchanger, the pressure of the stream is reduced as it discharges from the automated reactor pressure valve and enters the first of a two stage devolatilization system where the polymer is removed from much of the solvent, hydrogen, and unreacted monomer and comonomer. The vaporized solvent and unreacted monomers are cooled and partially condensed prior to removing polar impurities such as water and reinjection into the reactor. The concentrated polymer solution is forwarded, via positive displacement pump, through a second heat exchanger where the stream is heated to a temperature in the range of 200° C.-275° C. The effluent from this heat exchanger discharges into a devolatilizer that operates under vacuum in the range of 5-30 mmHg-absolute. The vaporized solvent and unreacted monomers are cooled and partially condensed prior to removing polar impurities such as water and reinjection into the reactor. The nearly pure polymer melt (polymer concentration ≥99.8 wt %) is forwarded to the pastillation system via mechanical, positive displacement pump.

Preferably the devolatilized polymer melt is pumped through a heat exchanger that is used to manipulate the polymer temperature, such as to yield a processing viscosity with a value less than approximately 3000 cP at said processing temperature. A coriolis meter in the pipe on the outlet side of the heat exchanger measures the polymer melt flow rate and density and a differential pressure transmitter measures the pressure drop across the coriolis meter. Together these parameters are used to calculate the viscosity of the fluid at the processing temperature as the polymer melt enters the droplet former. For final polymer product viscosities less than or equal to approximately 3000 cP at 177° C. (as measured via ASTM D3236), the polymer is cooled as it passes through the heat exchanger. For final polymer product viscosities greater than 3000 cP at 177° C., the polymer is heated as it passes through the heat exchanger. The polymer temperature typically less than 300° C., for example less than 275° C., or in the range of from 80 to 250° C.; thereby producing an ultra-low viscosity polymer melt. Subsequently, the heated, molten polymer is fed to a pastillator to be converted from liquid to discreet, solid pastilles.

Molten polymer can be pumped to the droplet forming section of the pastillation unit. Typically technologies used to feed the droplet former include single screw extruders, twin screw extruders, and centrifugal pumps as well as positive displacement pumps including piston and the preferred technology, gear pumps. A single pump or, as shown in the process flow diagram, multiple pumps can be utilized to feed the polymer from the final flash vessel to the pastillator. Also, the polymer melt can be pumped directly to the pastillator or first through a heat exchanger utilized to control the polymer temperature entering the droplet former within the target range of 80 to 300° C. and most preferably 125 to 250° C.

Molten polymer can enter the pastillation unit through the feed bar section within the droplet former. The pump pushes molten polymer through the feed bar and into a rotating shell containing holes. Polymer discharges through the holes in the shell and deposits onto a steel, conveying belt in the form of molten pastilles. A pastille has a hemispherical shape with the flat side in contact with the belt. The belt rotates in the opposite direction of the droplet former thus taking the molten pastilles away from the rotating shell. Chilled water is sprayed onto the underside of the belt to conductively cool the pastilles while they travel the length of the belt before discharging into a conveying system.

Some embodiments are as follows.

1) A process to form an olefin-based polymer, said process comprising at least the following steps:
   a) polymerizing a reaction mixture comprising an olefin, in at least one reactor, in a solution polymerization, to form a polymer solution;
   b) feeding at least a portion of the polymer solution through at least one devolatilizer, to form the olefin-based polymer, in melt form;
   c) feeding at least a portion of the olefin-based polymer, in melt, form through a heat exchanger, and then into a pastillation apparatus to form polymer particles.

2) The process as described in 1) above, wherein the process is a continuous process.

3) The process of as described in 1) or 2) above, wherein, for step c, the pastillation apparatus comprises a droplet former, and wherein the olefin-based polymer, in melt form, comes into contact with, and is discharged through, the droplet former and cooled on a belt.

4) The process as described in 3) above, where the viscosity ($\eta$ (in cP)) of the olefin-based polymer at the temperature of the olefin-based polymer at the droplet former (T, ° C.) meets the following relationship:

$$\ln(\eta) \leq [0.028T - b(T-T_0) + 2.96],$$

where the coefficient b indicates the temperature sensitivity of the viscosity of the olefin-based polymer; $T_0$ is a reference temperature (177° C.), and $T > T_m + 20°$ C. where $T_m$ is the melting point of the olefin based polymer; and T is the temperature of the olefin-based polymer at the droplet former; and where $\eta = \eta_0 e^{-b(T-T_0)}$, where $\eta_0$ is the viscosity (cP) of the olefin-based polymer at 177° C.

5) The process as described in any one of 1)-4) above, wherein the olefin-based polymer has a melt viscosity (177° C.) from 500 to 10000 cP, or from 600 to 9000 cP, or from 700 to 8000 cP, or from 800 to 7000 cP, or from 900 to 6000 cP, or from 1000 to 5000 cP, for from 1200 to 4500 cP, or from 1400 to 4000 cP, or from 1600 to 3500 cP.

6) The process as described in any one of 1)-5) above, wherein the temperature of the olefin-based polymer melt at the droplet former is from 130° C. to 250° C.

7) The process as described in any one of 1)-6) above, wherein a heat exchanger is located upstream from the pastillation apparatus.

8) The process as described in any one of 1)-7) above, wherein the olefin based polymer has a number average molecular weight from 4000 g/mol to 25,000 g/mol and a MWD<3.5, or <3.40, or <3.30, or <3.20.

9) The process as described in any one of 1)-8) above, wherein the olefin based polymer has a density of 0.86 g/cc to 0.90 g/cc.

10) The process as described in any one of 1)-9) above, wherein the olefin-based polymer has a molecular weight distribution (MWD) from 1.80 to 3.50, or from 1.90 to 3.40, or from 2.00 to 3.30, or from 2.10 to 3.20, or from 2.20 to 3.10.

11) The process as described in any one of 1)-10) above, wherein the olefin-based polymer is a propylene-based polymer.

12) The process as described in 11) above, wherein the propylene-based polymer is a propylene-based interpolymer, and further a propylene-based copolymer.

13) The process as described in 11) above, wherein the propylene-based polymer is a propylene/alpha-olefin interpolymer, and further a propylene/alpha-olefin copolymer, and further a propylene/C4-C8 alpha-olefin copolymer.

14) The process as described in 11) above, wherein the propylene-based polymer is a propylene/ethylene interpolymer, and further a propylene/ethylene copolymer.

15) The process as described in any one of 1)-10) above, wherein the olefin-based polymer is an ethylene-based polymer.

16) The process as described in 15) above, wherein, the ethylene-based polymer is an ethylene-based interpolymer, and further an ethylene-based copolymer.

17) The process as described in 15) above, wherein the ethylene-based polymer is an ethylene/alpha-olefin interpolymer, and further an ethylene/alpha-olefin copolymer, and further an ethylene/C3-C8 alpha-olefin copolymer.

18) The process as described in any one of 1)-17) above, wherein the olefin-based polymer has density from 0.855 to 0.960 g/cc, or from 0.860 to 0.950 g/cc, or from 0.865 to 0.940 g/cc, or from 0.870 to 0.930 g/cc, or from 0.875 to 0.920 g/cc, or from 0.870 to 0.910 g/cc, for from 0.870 to 0.900 g/cc, or from 0.870 to 0.890 g/cc, or from 0.870 to 0.885 g/cc.

19) The process as described in any one of 1)-18) above, wherein the olefin-based has a number average molecular weight (Mn) from 5000 to 30000 g/mole, or from 10000 to 25000 g/mole, or from 10000 to 22000 g/mol.

20) The process as described in any one of 1)-19) above, wherein the olefin-based has a molecular weight distribution (MWD) from 1.80 to 3.20, or from 1.90 to 3.15, or from 2.00 to 3.10, or from 2.10 to 3.05, or from 2.20 to 3.00.

21) The process as described in any one of 1)-20) above, wherein the olefin-based has a weight average molecular weight (Mw) from 25000 to 50000 g/mole, or from 27000 to 50000 g/mole, or from 30000 to 50000 g/mol.

22) The process as described in any one of 1)-21) above, wherein the olefin-based has number average molecular weight from 4000 g/mole to 25,000 g/mole, and a MWD≤3.50, or ≤3.40, or ≤3.30, or ≤3.20.

23) The process as described in any one of 1)-22) above, wherein the olefin-based has a viscosity, at 177° C. <20,000 cP, or <10,000 cP, or <5,000 cP.

24) The process as described in any one of 1)-23) above, wherein the olefin-based polymer melt entering the droplet former is from 130° C. to 280° C., or from 135° C. to 270° C., or from 140° C. to 260° C., or from 140° C. to 250° C.

25) The process as described in any one of 1)-24) above, wherein two or more pastillation apparatuses are placed in parallel.

26) The process as described in any one of 1)-25) above, wherein the solution polymerization takes place in one or more reactors selected from loop reactors, isothermal reactors, and/or stirred tank reactors, and further loop reactors and/or stirred tank reactors.

27) The process as described in any one of 1)-26) above, wherein the polymerization temperature is in the range from 100 to 300° C., or from 110 to 250 C, or from 120 to 200 C, 28) The process as described in any one of 1)-27) above, wherein the polymerization pressure is in the range of from 300 to 1,000 psig, or from 350 to 800 psig, or from 400 to 600 psig.

29) The process as described in any one of 1)-28) above, wherein the residence time for the solution phase polymerization process is from 2 to 30 minutes, or from 2 to 20 minutes, or from 2 to 10 minutes, or from 2 to 5 minutes.

30) The process as described in any one of 1)-29) above, wherein the polymer particles are in the fem of polymer pastilles, which have ≤2,000 $ppm_w$, or ≤1000 $ppm_w$, or ≤750 $ppm_w$, or ≤500 $ppm_w$, of residual volatile components, based on weight of polymer pastilles. Sample is acquired within 30 minutes of pastillation, and sealed in a vial for off-line laboratory analysis.

Definitions

Unless stated to the contrary, implicit from the context, or customary in the art, all parts and percents are based on weight, and all test methods are current as of the filing date of this application.

The term "devolatilizer," as used herein, refers to a mechanical device that is operated to allow volatile components (i.e., solvent, unreacted monomers, comonomers, and hydrogen) of a stream to vaporize and separate from less volatile components (i.e., polymer). A standard devolatilization unit is a pressure vessel that operates partially filled and at a lower pressure than the incoming stream (for example, a polymer solution) pressure thus allowing the low boiling components to vaporize.

The term "heat exchanger," as used herein, refers to a pressure vessel that processes two distinct streams, transferring energy between the streams without physically contacting the two. This device is designed to compactly provide the requisite surface area, along with manipulation and control of the utility fluid flow and inlet temperature, to properly transfer the heat energy to control the process fluid at target temperature. The shell and tube design is a common form of the technology used in the industry.

The term "pastillation apparatus," as used herein, refers to a mechanical device that is used to convert a liquid feed (i.e., molten polymer) to solid pastilles. The primary components of the apparatus include a droplet former, a heated hood, a conveying belt, and a chilled water spray. Polymer is ejected through the droplet former and onto the conveying belt in the form of pastilles. The droplet former and conveying belt rotate in the opposite direction. Cold water is sprayed on the underside of the conveying belt to conductively cool and solidify the molten pastilles as they move down the length of the belt.

The term "droplet former," as used herein, refers to a two component part comprising a stationary feed bar and a rotating outer shell that surrounds the feed bar, and which is used to create discrete droplets of molten polymer from the olefin-based polymer in melt form. Typically, the olefin-based polymer melt is pumped through a channel in the stationary feed bar, and the polymer melt is discharged through one or more orifices on the feed bar, into one or more channels through the rotating outer shell. The polymer melt is discharged through one or more holes on the shell, and-deposited onto a conveying belt. The rotation of the outer shell, typically a counterclockwise rotation, is in the opposite rotational direction to the conveying belt.

The term "heated hood," as used herein, refers to a heater (for example, an electric heater) that traverses the length of and is positioned in close proximity to the droplet former. The heated hood increases the air temperature around the droplet former to prevent cooling and the subsequent increase in viscosity/melt strength of the polymer as it is flowing through the holes on the rotating shell. This unit operation aims to reduce the tendency to form strings.

The term "polymer particles," as used herein, refers to the variety of shapes (i.e., granules, pastilles or pellets) in which the final polymer product is packaged. Traditionally, granules made via underwater pelletization are referred to as pellets. Low density polymers granulated via this technology typically are more spherical in shape while high density polymers are typically cylindrical in shape. Granules made via pastillation are referred to as pastilles. Since molten polymer is discharged onto a solid surface during pastillation, the pastille has a flat side with a rounded (hemispherical) top.

The term "pastillation rate," as used herein, for a given machine size (belt length and width), and cooling rate the pastillator, refers to the amount of polymer that can be converted to pastilles in a unit time. One or more pastillation units may be used in parallel to ensure that the polymerization rate and pastillation rate are matched.

The phrase "temperature of the olefin-based polymer at the droplet former," as used herein, refers to the temperature of the olefin-based polymer at the inlet of the droplet former.

The term "solution polymerization," as used herein, refers to a polymerization process in which the formed polymer is dissolved in the polymerization solvent.

The term "polymer solution," as used herein, refers to the complete dissolution of polymer in one or more solvents (typically much lower in molecular weight than polymer) to form a homogeneous liquid. The solution comprises the polymer and solvent, and may also comprise unreacted monomers and other residuals of the polymerization reaction.

The phrase "feeding at least a portion of the polymer solution through at least one devolatilizer," as used herein, refers ≥50 wt % of the olefin-based polymer, based on the total weight of the polymer solution available to be fed through at least one devolatilizer.

The term "solvent," as used herein, refers to a substance (for example, a hydrocarbon or a mixture of two or more hydrocarbons (excluding monomer and comonomer)) that dissolves a species of interest, like a monomer and/or polymer, resulting in a liquid phase.

The phrase "feeding at least a portion of the olefin-based polymer in melt form through a heat exchanger," as used herein, refers ≥50 wt % of the olefin-based polymer in melt form, based on the total weight of the olefin-based polymer available to be fed through the heat exchanger.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "olefin-based polymer" refers to a polymer that comprises 50 wt % or a majority amount of polymerized olefin (for example, ethylene or propylene), based on the weight of the polymer, and, optionally, may comprise at least one comonomer. The term "olefin-based polymer," or "olefin-based polymer in melt form," as used herein, refer to the polymer containing ≥99.0 wt %, preferably ≥99.5 wt %, more preferably ≥99.8 wt % of the olefin-based polymer, based on the weight of the olefin-based polymer.

The term "propylene-based polymer" refers to a polymer that comprises 50 wt % or a majority amount of polymerized propylene, based on the weight of the polymer, and, optionally, may comprise at least one comonomer.

The term "propylene-based interpolymer" refers to an interpolymer that comprises 50 wt % or a majority amount of polymerized propylene, based on the weight of the inter-polymer, and comprises at least one comonomer (for example, ethylene or a C4 or higher α-olefin).

The term "propylene-based copolymer" refers to a copolymer that comprises 50 wt % or a majority amount of polymerized propylene, based on the weight of the copolymer, and a comonomer, as the only monomer types (for example, ethylene or a C4 or higher α-olefin).

The term "ethylene-based polymer" refers to a polymer that comprises a majority amount of polymerized ethylene, based on the weight of the polymer, and, optionally, may comprise at least one comonomer.

The term "ethylene-based interpolymer" refers to an interpolymer that comprises a majority amount of polymerized ethylene, based on the weight of the interpolymer, and comprises at least one comonomer.

The term "ethylene-based copolymer" refers to a copolymer that comprises a majority amount of polymerized ethylene, based on the weight of the interpolymer, and a comonomer, as the only monomer types.

The term "reactor configuration," refers to one or more reactors, and optionally one or more reactor pre-heaters, used to polymerize a polymer. Such reactors include, but are not limited to, tubular reactor(s), autoclave reactor(s), and combinations of tubular and autoclave reactors.

The term "downstream," as used herein, in regard to a unit of operation, refers to a unit operation located after the current unit at issue. In regard to a direction of flow for a stream through the process, a stream flows from one unit operation to the next unit operation located downstream.

The term "upstream," as used herein, in regard to a unit of operation, refers to a unit operation located before the current unit at issue. In regard to a direction of flow for a stream through the process, a stream is processed in the reactor, for example, immediately before the first stage devolatilizer, and thus the reactor is upstream from the first stage devolatilizer.

The melting point ($T_m$) of the olefin based polymer, as used herein, refers to the highest intensity peak in a DSC profile, measured as described below.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density

Density is measured in accordance with ASTM D-792. The result is reported in grams (g) per cubic centimeter, or g/cc.

Melt Index

For propylene-based polymers, the melt flow rate (MFR) is measured in accordance with ASTM-D 1238, Condition 230° C./2.16 kg, and is reported in grams eluted per 10 minutes. For ethylene-based polymers, the melt index ($I_2$) is measured in accordance with ASTM-D 1238, Condition 190° C./2.16 kg, and is reported in grams eluted per 10 minutes.

Melt Viscosity—Polymer at 177° C.

Melt viscosity is determined by ASTM D3236, which is incorporated herein by reference, using a Brookfield Laboratories DVII+ Viscometer equipped with disposable aluminum sample chambers. In general, a SC-31 spindle is used, suitable for measuring viscosities in the range of from 30 to 100,000 centipoise (cP). If the viscosity is outside this range, an alternate spindle should be used which is suitable for the viscosity of the polymer. A cutting blade is employed to cut samples into pieces small enough to fit into the 1 inch (25.4 mm) wide, 5 inches (127 mm) long samples chamber. The disposable tube is charged with 8-9 grams of polymer. The sample is placed in the chamber, which is in turn inserted into a Brookfield Thermosel and locked into place with bent needle-nose pliers. The sample chamber has a notch on the bottom that fits in the bottom of the Brookfield Thermosel to ensure that the chamber is not allowed to turn when the spindle is inserted and spinning. The sample is heated to the desired temperature (177° C./350° F.). The viscometer apparatus is lowered and the spindle submerged into the sample chamber. Lowering is continued until brackets on the viscometer align on the Thermosel. The viscometer is turned on, and set to a shear rate which leads to a torque reading in the range of 40 to 70 percent. Readings are taken every minute for about 15 minutes, or until the values stabilize, and then the final reading is recorded. The results are reported in centipoise (cP).

Calculated Melt Viscosity of Polymer at T

The viscosity measured at 177° C. using ASTM D3236, can be converted to a viscosity at the melt temperature at the droplet former by using the empirical relationship $$\eta = \eta_0 e^{-b(T-T_0)},$$

or $$\ln(\eta) = \ln(\eta_0) - b(T-T_0),$$

where $\eta$ is the melt viscosity at the temperature T of the polymer at the droplet former, and $\eta_0$ is the viscosity of the polymer at the reference temperature $T_0$ which is 177° C. The coefficient b indicates the temperature sensitivity of viscosity of the polymer, and its value is from 0.02 to 0.03° C.$^{-1}$ for olefin-based polymers (see Chris Rauwendaal, Polymer Extrusion, Chapter 6, Hanser Publishers, 1996). The b value can be determined by measuring viscosity of the polymer at different temperatures, and plotting the ln($\eta$) versus (T–$T_0$), and calculating its slope of the profile. For the olefin based polymers used in this work, the b coefficient was determined to be 0.026° C.$^{-1}$.

Differential Scanning Calorimetry (DSC)

Differential Scanning calorimetry (DSC) is used to measure crystallinity in the polymers (e.g., ethylene-based (PE) polymer and propylene-based (PP) polymer). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to –60° C. for PE (–40° C. for PP), and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 165 J/g for PP, and multiplying this quantity by 100 (for example, % cryst.=(Hf/165 J/g)×100 (for PP)). Unless otherwise stated, melting point(s) ($T_m$) of each polymer is determined from the second heat curve (peak $T_m$), and the crystallization temperature (Tc) is determined from the first cooling curve (peak Tc).

Gel Permeation Chromatography (GPC) for Molecular Weight

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four, Mixed A LS 30 cm, 20 micron columns. The solvent is nitrogen-purged 1,2,4-trichlorobenzene (TCB) containing approximately 200 ppm 2,6-di-t-butyl-4-methyl-phenol (BHT). The flow rate is 1.0 mL/min, and the injection volume is 200 μl. A "2 mg/mL" sample concentration is prepared by dissolving the sample in "N2 purged" and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N. Y. Hellman, & P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}}, \quad \text{(Eqn. 1)}$$

where $M_{PP}$ is PP equivalent MW, $M_{PS}$ is PS equivalent MW, log K and a values of Mark-Houwink coefficients for PP and PS are listed below in Table A.

TABLE A

| Polymer | a | log K |
|---|---|---|
| Polypropylene | 0.725 | −3.721 |
| Polystyrene | 0.702 | −3.900 |

A logarithmic molecular weight calibration is generated using a fourth order polynomial fit, as a function of elution volume. Number average and weight average molecular weights are calculated according to the following equations:

$$M_n = \frac{\sum_i W f_i}{\sum_i \left(\frac{W f_i}{M_i}\right)}, \quad \text{(Eqn. 2)}$$

$$M_w = \frac{\sum_i (W f_i * M_i)}{\sum_i (W f_i)}, \quad \text{(Eqn. 3)}$$

where Wfi and Mi are the weight fraction and molecular weight of elution component i, respectively. The mass detector constant, laser light scattering detector constant and viscometer detector constant are determined using a standard reference (reference polymer is a linear polyethylene homopolymer) with a known value of weight average molecular weight (Mw=120,000 g/mol; dn/dc=−0.104 mL/g; MWD=2.9) and intrinsic viscosity (1.873 dL/g). The chromatographic concentrations are assumed low enough to eliminate addressing second Virial coefficient effects (concentration effects on molecular weight).

Examples

Polymerization Overview

The polymerization process is a solution polymerization process using one or more reactors, for example, loop reactors, isothermal reactors, plug flow reactors, and/or stirred tank reactors. Such reactors may be used in parallel, series, and/or any combination thereof, in continuous or batch mode to produce olefin based polymers (e.g., propylene-based polymers or ethylene-based polymers). See the FIGURE for a schematic of a solution polymerization and isolation process.

A solution polymerization process may occur in one or more well-stirred reactors, such as one or more loop reactors or one or more isothermal reactors, and at a temperature in the range from 100° C. to 300° C. (for example, from 120° C. to 190° C.), and at pressures in the range from 300 psig to 1,000 psig (for example, from 500 psig to 750 psig). The residence time in the solution polymerization process is typically in the range from 2 to 30 minutes (for example, from 5 to 20 minutes). One or more α-olefins (e.g., propylene or ethylene), solvent, hydrogen, one or more catalyst systems, and, optionally, one or more comonomers, are fed continuously to the reactor. Exemplary solvents include, but are not limited to, isoparaffins and naphthenics. For example, such solvents are commercially available under the name ISOPAR E from ExxonMobil Chemical Co., Houston, Tex., or under the name SBP 100/140 from Shell Chemicals Europe. The reactant feed temperature is typically controlled from 5° C. to 50° C., by passing the feed through a heat exchanger system. Typically, the feed to the reactor is controlled at 15° C.

The catalyst components are injected into the polymerization reactor through, for example, an inlet injection device within the reactor, and are combined with the polymerizing reaction solution. The catalyst complex and cocatalyst components can also be combined, and fed to the reactor as a single stream, through the injection device. The catalyst complex is continuously injected into the reactor, to maintain the reactor monomer concentration at a specified target. The cocatalyst components are fed, based on calculated molar ratios relative to the catalyst complex.

The effluent from the polymerization reactor (containing solvent, monomer, comonomer, hydrogen, catalyst components, and molten polymer) is contacted with a catalyst deactivating agent (typically water) to stop the reaction. In addition, various additives, such as anti-oxidants, can be added at this point. The reactor effluent (containing solvent, monomer, comonomer, hydrogen, catalyst components, and molten polymer) then passes through a heat exchanger, to raise the stream temperature in preparation for separation of the polymer from the lower boiling reaction components. The stream then passes through a pressure let down control valve, which is used to maintain the pressure of the reactor at the specified target, and then passes into a multi-stage devolatilization system, where the polymer is removed from the solvent, hydrogen, and unreacted monomer and comonomer. Impurities are removed from the recycled, lower boiling reaction components, before entering the reactor again.

The volatile components, removed in the devolatilization step, may be recycled or destroyed. For example, most of the solvent is condensed, and recycled back to the reactor, after passing through purification beds. This recycled solvent may contain unreacted comonomer, and can be fortified with fresh comonomer, prior to reentry to the reactor. This recycle solvent may also contain hydrogen, and can be fortified with fresh hydrogen.

The pump at the outlet of the final devolatilizer feeds the devolatilized, low viscosity polymer melt to a heat exchanger, followed by the pastillation system, and optionally, feeds the polymer melt to a booster pump, which moves the polymer melt through the heat exchanger, and then through the pastillation system. As the polymer flows through the heat exchanger, heat energy is added or removed from the polymer melt, prior to pastillation. For polymers with a product viscosity less than, or equal to, 3000 cP at 177° C. (ASTM D3236), the heat exchanger is used to cool the polymer melt, and for polymers with a product viscosity greater than 3000 cP at 177° C., the heat exchanger is used to heat the polymer melt. To prevent plugging of the melt heat exchanger and/or the pastillation system, the minimum polymer melt temperature during the pastillation step is "Tm+20° C.", where "Tm" is the melting point temperature of the polymer product (as determined by DSC). To prevent polymer degradation, the maximum temperature is typically limited to 300° C.

The polymer melt enters the pastillation system through a droplet former (see the FIGURE). Here, the "droplet former" consists of a stationary feed bar, enveloped by a rotating cylindrical steel shell, equipped with holes on its circumference. Molten polymer from the feed bar section of the droplet former flows radially through the rotating shell, before discharging from the holes in the steel shell, and onto a steel conveying belt. Substantially uniform polymer droplets, or pastilles, deposit onto the conveying belt. For a given throughput, the pastille diameter can be varied by manipulating the number of holes on the shell of the droplet former and/or the diameter of the holes, and a typical pastille diameter is from 1 mm to 4 mm. The droplet former rotates counterclockwise, in the opposite direction of the moving belt. Chilled water is sprayed on the underside of the belt, to conductively cool and solidify the pastilles, before they discharge from the belt and into the conveying system (ambient atmosphere), which forwards the pastilles to a storage hopper. The chilled water can be at temperature from 1° C. to 40° C., with a preferred temperature from 1° C. to 5° C.

The polymer pastilles typically have less than 1,500 $ppm_w$ (parts per million per weight basis), further less than 1,000 $ppm_w$, further less than 500 $ppm_w$, of volatile impurities, measured immediately after pastillation. The polymer products typically have a viscosity less than 30000 cP (177° C.); for example, in the range from 1000 to 10000 cP (177° C.), when measured according to ASTM D3236.

Actual Polymerizations and Pastillations

Production of the samples described below was executed using a loop reactor comprising a positive displacement pump that continuously circulated the reaction liquor through two shell and tube heat exchangers. SYLTHERM 800 flowed across the shell side of the heat exchangers, to remove some of the reaction heat, and keep the reaction liquor at the target temperature, 155° C. Since the reactor operated hydraulically full, the reactor effluent was equal to the sum of the individually controlled component feed flows described below. Production of these samples was completed at a reaction pressure equal to 550 psig, to ensure the reaction liquor was a single, liquid phase.

ISOPAR E (solvent) and propylene (monomer) were each individually pumped to the reactor. The ISOPAR E flow was manipulated to maintain a solvent to monomer ratio equal to 2.0. The ethylene (comonomer) feed was pressurized using a compressor, and the flow was manipulated to maintain a monomer to comonomer ratio equal to 14.5. The flow of high purity hydrogen (from high pressure gas cylinders) was metered into the ethylene stream at a rate sufficient to keep the polymer viscosity at the 1,000 cP target. For the reaction conditions used to produce the inventive polymer (IP-5), the feed rate was 34 grams per hour. All three feeds were mixed and subsequently passed through a heat exchanger system to control the stream temperature at 10° C. This cold feed stream was injected into the polymerization reactor operating at 155° C. and 550 psig.

The catalyst package was a three component system. The hafnium, [[rel-2',2'''-[(1R,2R)-1,2-cyclohexanediylbis (methyleneoxy-.kappa.O)]bis[3-(9H-carbazol-9-yl)-5-methyl[1,1'-biphenyl]-2-olato-.kappa.O]](2-)]dimethyl-catalyst complex was used to produce the copolymer samples. The cocatalyst activator was bis(hydrogenated tallow alkyl)methyl-ammonium, tetrakis(pentafluorophenyl) borate. The aluminum scavenger consisted of aluminoxanes, iso-Bu Me, branched, cyclic and linear; modified methyl aluminoxane.

The catalyst flow was manipulated to control the propylene conversion at 91 wt %. The ethylene conversion was dictated by the reaction conditions and the catalyst kinetics, and it was not directly controlled. The flow of ethylene was manipulated to keep the polymer density at the 0.8830 g/cc target. The bulk melting temperature for the polymer (Tm) was 103° C. The cocatalyst activator flow was manipulated (with the catalyst flow) to maintain a molar ratio of cocatalyst to catalyst metal at 2.4. The aluminum scavenger flow was manipulated (with the catalyst flow) to maintain a molar ratio of aluminum to catalyst metal equal to 30. Each of the three components in the catalyst package was separately pumped directly to the reactor using positive displacement pump technology.

Upon exiting the reactor, the polymer was contacted with stoichiometric amounts of deionized water (to catalyst components) to terminate the polymerization. Subsequently the polymer solution passed through a heat exchanger to increase the stream temperature to 255° C., as preparation to remove the solvent and unreacted monomers from the polymer. After heating, the stream passed through a pressure let down valve, and into a devolatilizer vessel operating at 200° C. and 10 psig. The polymer stream cooled to approximately 200° C., as a result of the evaporation of the light components. The polymer rich melt was pumped from the bottom of the vessel using a gear pump, while the vaporized components exited the top of the vessel. The polymer rich phase was pumped through another heat exchanger to heat the stream to 225° C., for the second and final devolatilization. The hot stream entered the second devolatilizer vessel operating at a 200° C. and 12 mmHg-absolute. The polymer melt with less than 2,000 $ppm_w$ volatile components was pumped from the bottom of the vessel using a gear pump, while the vaporized components exited the top of the vessel.

The polymer melt was pumped from the second stage gear pump to a booster pump. The booster pump generated the pressure required to push the polymer through a downstream heat exchanger and pastillator system. The polymer melt was cooled to 144° C. to properly pastillate the polymer without fiber formation. The droplet former rotated counterclockwise, at a speed of 28 feet per minute, while the conveying belt rotated clockwise at the same speed, 28 feet per minute. Water, at a flow rate equal to 6,000 lbs/hr and a temperature equal to 5° C., was sprayed on the underside of the belt to cool and solidify the pastilles, before they disengaged from the belt, and into an air conveying system for transfer to a hopper.

Given the polymer specification of 0.8830 g/cc (Tm=103° C.) and 1,000 cP at 177° C., the polymer could be cooled (with the heat exchanger upstream of the pastillator), to facilitate pastillation at maximum rate and without the fiber defect. When the polymer was cooled to 134° C., the melt viscosity increased to 3,423 cP and fibers (CP-E) were observed while pastillating. While holding everything else constant in the polymerization and pastillation process, the shell side fluid temperature was increased for the heat exchanger upstream of the pastillator, to target a polymer melt exit temperature of 144° C. At 144° C., the melt viscosity dropped to 2,462 cP and the fiber defect (IP-5) was eliminated.

Polymerization conditions, pastillation conditions and some polymer properties are shown in Tables 1-4. Each polymer is specified by its density at 23° C. and viscosity at 177° C. The density of the polymer is co-related to its melting temperature (Tm). From Table 2 it is determined that to avoid fiber formation the following criteria must be met for the viscosity (cP) of the olefin-based polymer at the melt temperature (T, ° C.) at the droplet former:

$$\ln(\eta) \leq [0.028T - b(T-T_0) + 2.96],$$

where b is the temperature sensitivity of viscosity and $T_0$ a reference temperature (177° C.) and $T > T_m + 20°$ C. where $T_m$ is the melting point of the olefin based polymer. All inventive olefin-based copolymers in Table 2 meet this condition and hence no fiber formation resulted. From Table 4 it is observed that for all comparative polymers the above criteria is not met and as a result fiber formation is observed.

TABLE 1

Polymerization Conditions and Polymer Properties for Inventive Polymers

|  | Units | IP-1 | IP-2 | IP-3 | IP-4 | IP-5 |
|---|---|---|---|---|---|---|
| Reactor Temp | °C. | 155 | 155 | 155 | 155 | 155 |
| Reactor Pressure | psig | 550 | 550 | 550 | 550 | 550 |
| Propylene Feed | lbs/hr | 180 | 180 | 180 | 180 | 188 |
| Ethylene Feed | lbs/hr | 12.0 | 11.8 | 12.2 | 15.8 | 12.8 |
| Hydrogen Feed | grams/hr | 28 | 24 | 20 | 17 | 34 |
| ISOPAR E Feed | lbs/hr | 357 | 357 | 357 | 341 | 381 |
| Catalyst Metal Feed | mg Hf/hr | 77 | 39 | 31 | 51 | 83 |
| Cocatalyst Activator* Molar Ratio | moles cocat/mole Hf | 1.2 | 1.2 | 1.3 | 1.8 | 2.4 |
| Aluminum Molar Ratio | moles Al/mole Hf | 25 | 32 | 40 | 37 | 31 |
| Propylene Conversion | wt % [(reactor feed propylene − reactor exit propylene)]/(reactor feed propylene) | 91.1 | 90.8 | 91.1 | 91.4 | 91.1 |
| Ethylene Conversion | wt %, [(reactor feed ethylene − reactor exit ethylene)]/(reactor feed ethylene) | 93.0 | 92.7 | 93.2 | 93.5 | 92.9 |
| Polymer Density | g/cc | 0.8832 | 0.8831 | 0.8827 | 0.8736 | 0.8832 |
| Polymer Viscosity | cP @ 177° C. | 2135 | 2904 | 4316 | 8025 | 1044 |
| ln(Polymer Viscosity) | ln(cP) @ 177° C. | 7.67 | 7.97 | 8.37 | 8.99 | 6.95 |
| Mn | g/mole | 11512 | 16864 | 18597 | 20207 | 12301 |
| Mw | g/mole | 33848 | 39889 | 43692 | 49484 | 27101 |
| Mw/Mn | — | 2.94 | 2.37 | 2.35 | 2.45 | 2.20 |
| $T_m$ (DSC test method) | °C. | 103 | 103 | 102 | 85 | 103 |

*Cocatalyst activator = bis(hydrogenated tallow alkyl)methyl-ammonium, tetrakis(pentafluorophenyl)-borate

TABLE 2

Pastillation Conditions for Inventive Polymers

| Parameter | Units | IP-1 | IP-2 | IP-3 | IP-4 | IP-5 |
|---|---|---|---|---|---|---|
| Temperature of propylene/ethylene copolymer melt at droplet former (T)* | °C. | 168 | 192 | 196 | 220 | 144 |
| $\eta_0$** @ $T_0$, ($T_0$ = 177° C.) | cP | 2135 | 2904 | 4316 | 8025 | 1044 |
| $\eta$*** = $\eta_0 e^{-b(T-T_0)}$ | cP | 2698 | 1966 | 2634 | 2624 | 2462 |
| ln(η) | ln(cP) | 7.90 | 7.58 | 7.88 | 7.87 | 7.81 |
| Eqn. A**** | ln(cP) | 7.90 | 7.95 | 7.95 | 8.00 | 7.85 |
| $T_m$ + 20° C. | °C. | 123 | 123 | 122 | 105 | 123 |
| Fibers***** | Yes/No | No | No | No | No | No |

*Direct measurement of the propylene/ethylene copolymer melt temperature at the droplet former.
**Measured polymer viscosity (ASTM D3236) at 177° C. from Table 1.
***Calculated viscosity of the propylene/ethylene copolymer is measured at the temperature of the copolymer at the inlet droplet former; b value = 0.026° C.$^{-1}$, and $\eta_0$ is the viscosity of the olefin-based polymer at 177° C.
****Eqn. A = 0.028 [ln(cP)/° C.]T − b(T − $T_0$) + 2.96 [ln(cP)], where T = temperature of propylene/ethylene copolymer melt at droplet former; $T_0$ = 177° C.; and coefficient b = 0.026° C.$^{-1}$.
*****Visual determination of conveyed pastilles—examine surface of pastilles. Free-from fibers—pastilles that have the preferred hemispherical shape without an additional, thinly shaped and elongated polymer attached to the pastille.

TABLE 3

Reaction Conditions and Polymer Properties for Comparative Polymers

|  | Units | CP-A | CP-B | CP-C | CP-D | CP-E |
|---|---|---|---|---|---|---|
| Reactor Temp | C. | 155 | 155 | 155 | 155 | 155 |
| Reactor Pressure | psig | 550 | 550 | 550 | 550 | 550 |
| Propylene Feed | lbs/hr | 180 | 180 | 180 | 180 | 188 |
| Ethylene Feed | lbs/hr | 12.0 | 11.8 | 12.2 | 15.8 | 12.8 |
| Hydrogen Feed | grams/hr | 28 | 24 | 20 | 17 | 34 |
| ISOPAR E Feed | lbs/hr | 357 | 357 | 357 | 341 | 380 |
| Catalyst Metal Feed | mg Hf/hr | 77 | 39 | 31 | 51 | 86 |

TABLE 3-continued

Reaction Conditions and Polymer Properties for Comparative Polymers

|  | Units | CP-A | CP-B | CP-C | CP-D | CP-E |
|---|---|---|---|---|---|---|
| Cocatalyst Activator Molar Ratio | moles cocat/ mole Hf | 1.2 | 1.2 | 1.3 | 1.8 | 2.4 |
| Aluminum Molar Ratio | moles Al/ mole Hf | 25 | 32 | 40 | 37 | 30 |
| Propylene Conversion | wt % | 91.1 | 90.8 | 91.1 | 91.4 | 90.8 |
| Ethylene Conversion | wt % | 93.0 | 92.7 | 93.2 | 93.5 | 92.6 |
| Final Polymer Properties | | | | | | |
| Polymer Density | g/cc | 0.8830 | 0.8831 | 0.8827 | 0.8736 | 0.8832 |
| Polymer Viscosity | cP @ 177 C. | 2113 | 2904 | 4316 | 8025 | 1119 |
| Ln(Polymer Viscosity) | Ln(cP) at 177 C. | 7.66 | 7.97 | 8.37 | 8.99 | 7.02 |
| Mn | g/mole | 11512 | 16864 | 18597 | 20207 | 11683 |
| Mw | g/mole | 33848 | 39889 | 43692 | 49484 | 28251 |
| Mw/Mn | — | 2.94 | 2.37 | 2.35 | 2.45 | 2.44 |
| $T_m$ | ° C. | 103 | 103 | 102 | 85 | 103 |

*Cocatalyst activator = bis(hydrogenated tallow alkyl)methyl-ammonium, tetrakis(pentafluorophenyl)-borate

TABLE 4

Pastillation Conditions for Comparative Polymers

| Parameter | Units | CP-A | CP-B | CP-C | CP-D | CP-E |
|---|---|---|---|---|---|---|
| Temperature of propylene/ethylene copolymer melt at droplet former* | ° C. | 144 | 152 | 187 | 200 | 134 |
| $\eta_0$ @ $T_0$, ($T_0$ = 177° C.)** | cP | 2113 | 2904 | 4316 | 8025 | 1119 |
| $\eta$*** @ Droplet former temperature, $\eta = \eta_0 e^{-b(T-T_0)}$ | cP | 4983 | 5563 | 3328 | 4413 | 3423 |
| ln($\eta$) | ln(cP) | 8.51 | 8.62 | 8.11 | 8.39 | 8.14 |
| Eqn. A**** | ln(cP) | 7.85 | 7.87 | 7.94 | 7.96 | 7.83 |
| $T_m$ + 20° C. | ° C. | 123 | 123 | 122 | 105 | 123 |
| Fibers***** | Yes/No | Yes | Yes | Yes | Yes | Yes |

*Direct measurement of the propylene/ethylene copolymer melt temperature of the copolymer at the droplet former.
**Measured polymer viscosity (ASTM D3236) at 177° C. from Table 3.
***Calculated Viscosity of the propylene/ethylene copolymer is measured at the temperature of the copolymer at the droplet former; b value = 0.026° C.$^{-1}$, and $\eta_0$ is the viscosity of the olefin-based polymer at 177° C.
****Eqn. A = 0.028T − b(T − $T_0$) + 2.96, where T = temperature of propylene/ethylene copolymer melt at droplet former. $T_0$ = 177° C.; and coefficient b = 0.026° C.$^{-1}$].
*****Visual determination of conveyed pastilles—examine surface of pastilles.

What is claimed is:

1. A process to form an olefin-based polymer, said process comprising at least the following steps:
   a) polymerizing a reaction mixture comprising an olefin, in at least one reactor, in a solution polymerization, to form a polymer solution;
   b) feeding at least a portion of the polymer solution through at least one devolatilizer, to form the olefin-based polymer, in melt form;
   c) feeding at least a portion of the olefin-based polymer, in melt, form through a heat exchanger, and then into a pastillation apparatus to form polymer particles.

2. The process of claim 1, wherein the process is a continuous process.

3. The process of claim 1, wherein, for step c, the pastillation apparatus comprises a droplet former, and wherein the olefin-based polymer, in melt form, comes into contact with, and is discharged through, the droplet former and cooled on a belt.

4. The process of claim 3, where the viscosity ($\eta$ (in cP)) of the olefin-based polymer at the temperature of the olefin-based polymer at the droplet former (T, ° C.) meets the following relationship:

$$\ln(\eta) \leq [0.028T - b(T-T_0) + 2.96],$$

where the coefficient b indicates the temperature sensitivity of the viscosity of the olefin-based polymer; $T_0$ is a reference temperature (177° C.), and T>$T_m$+20° C. where $T_m$ is the melting point of the olefin based polymer; and T is the temperature of the olefin-based polymer at the droplet former; and where $\eta = \eta_0 e^{-b(T-T_0)}$, where $\eta_0$ is the viscosity (cP) of the olefin-based polymer at 177° C.

5. The process of claim 1, wherein the olefin-based polymer has a melt viscosity (177° C.) from 500 to 10000 cP.

6. The process of claim 1, wherein a heat exchanger is located upstream from the pastillation apparatus.

7. The process of claim 1, wherein the olefin based polymer has a number average molecular weight from 4000 g/mol to 25,000 g/mol and a MWD<3.5.

8. The process of claim 1, wherein the olefin-based polymer has a molecular weight distribution (MWD) from 1.80 to 3.50.

9. The process of claim 1, wherein the olefin-based polymer is a propylene-based polymer.

10. The process of claim 1, wherein the olefin-based polymer is an ethylene-based polymer.

* * * * *